July 21, 1925.  
R. O. FRIEND  
WATER SOFTENING APPARATUS  
Filed April 5, 1923
1,546,374
2 Sheets-Sheet 1
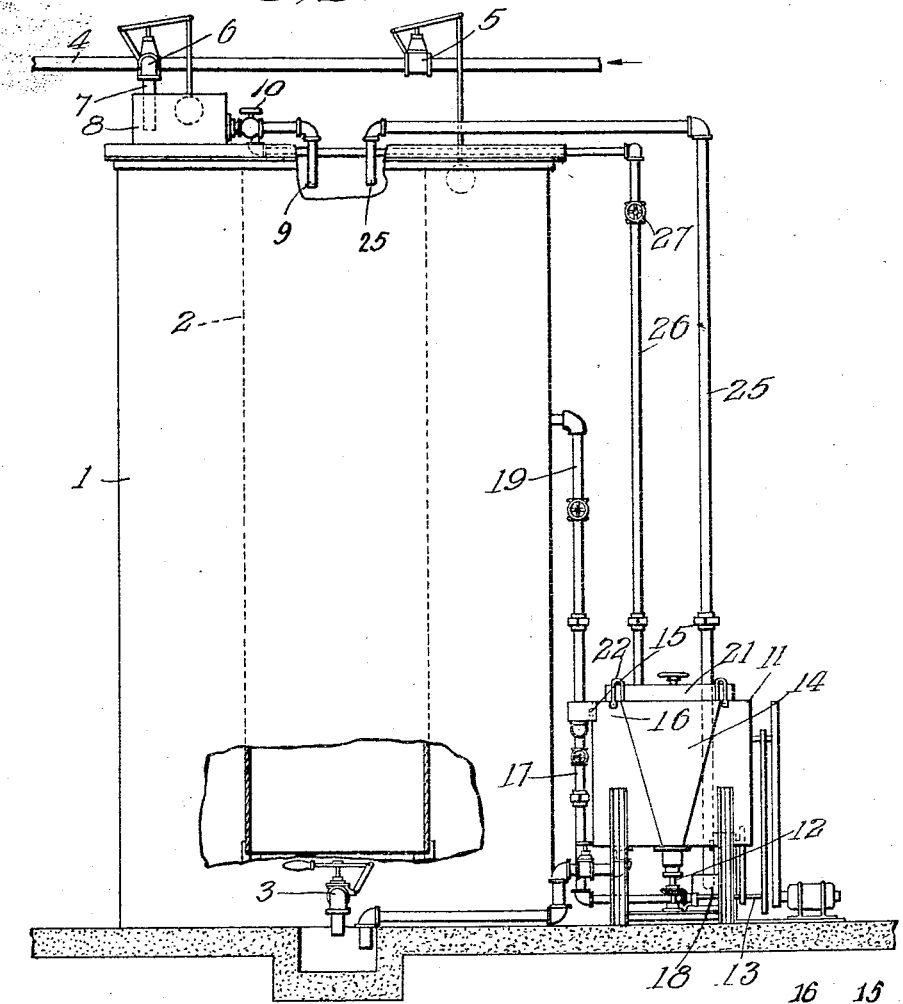
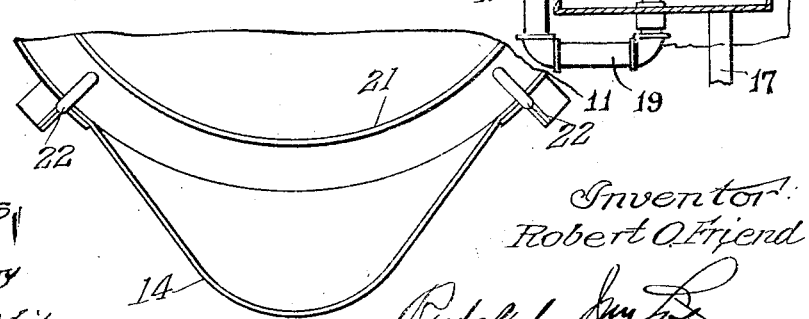

July 21, 1925.
R. O. FRIEND
1,546,374
WATER SOFTENING APPARATUS
Filed April 5, 1923   2 Sheets-Sheet 2
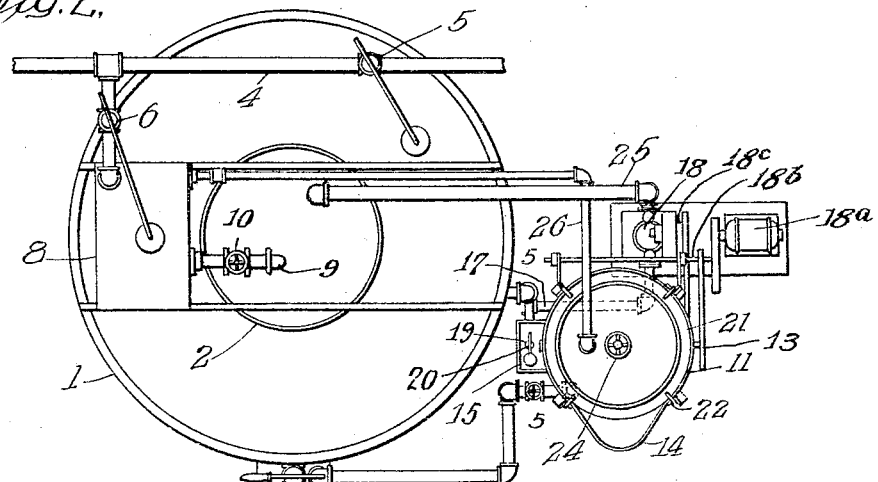
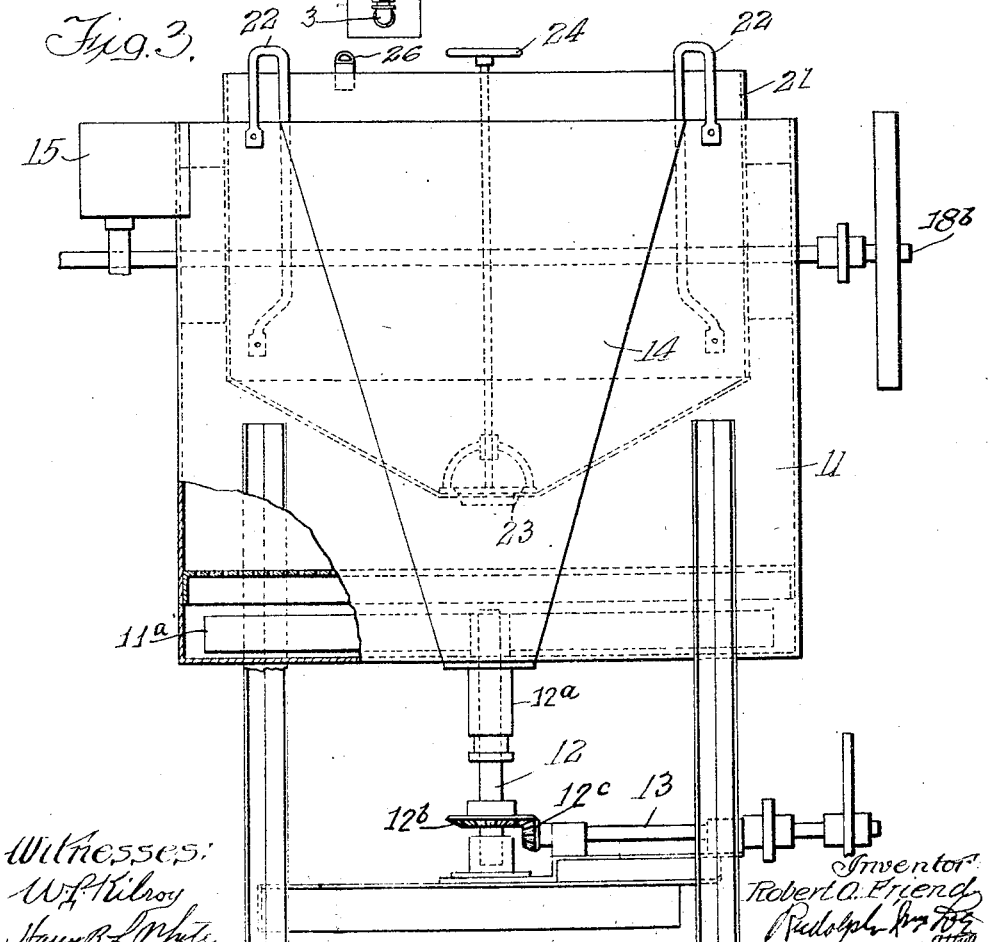

Patented July 21, 1925.

1,546,374

UNITED STATES PATENT OFFICE.

ROBERT O. FRIEND, OF CHICAGO, ILLINOIS.

WATER-SOFTENING APPARATUS.

Application filed April 5, 1923. Serial No. 630,055.

*To all whom it may concern:*

Be it known that I, ROBERT O. FRIEND, a citizen of the United States, residing at Chicago, in the county of Cook and State of Illinois, have invented certain new and useful Improvements in Water-Softening Apparatus, of which the following is a specification.

This invention has for its objects to provide certain new and useful improvements in that type of water softening apparatus used for carrying out the so-called lime soda process, wherein a solution of a lime-salt and a sodium salt is admixed with the hard water to effect precipitation of the hard salts of the latter.

The present invention relates more particularly to the means whereby a definite proportion or quantity of the lime-soda solution is fed to and admixed with the hard water in a constantly uniform quantity definitely proportioned to the volume of hard water to be softened per unit of time.

A further object of the invention is to provide means whereby the water to be softened as well as that which effects a continuous proportionate flow of chemical solution for admixture with the hard water, is positively rendered constantly uniform so that any variation in rate of flow is obviated.

A still further object of the invention is to so employ a part of the water to be softened as to thereby effect a continuous flow of the chemical solution without admixing the latter with that portion of the water which effects the flow of said chemical solution and without wasting any of said water.

Another object of the invention is to provide means as aforesaid for effecting the flow of chemical uniformly and in definite proportion to the flow of hard water to be softened, wherein the water effecting the flow of the chemical is saved and is subsequently employed as the basis of the mixture constituting the next succeeding batch of the chemical solution to be used.

A suitable embodiment of the invention is illustrated in the accompanying drawings wherein—

Figure 1 is a view in side elevation of a lime soda plant constructed in accordance with the invention;

Fig. 2 is a top plan view of the same;

Fig. 3 is a view in elevation of the lime soda solution container and the means for feeding the uniform amount thereof to be admixed with the hard water; and Fig. 4 is a fragmentary detail plan view of the device shown in Fig. 3;

Fig. 5 is a fragmentary detail vertical section on the line 5—5 of Fig. 3.

In apparatus of the character referred to a predetermined amount of chemical solution is added to and admixed with the hard water in order to effect precipitation of the hard salts thereof. Many attempts have been made to secure an absolutely constant and uniform flow of such chemical for admixture with the hard water in exactly the proper proportion but so far as I am informed this object has not been heretofore accomplished. It is also very desirable to avoid the waste of any water in the operation of the plant.

The apparatus includes the usual settling or precipitation storage tank 1, which may be of any desired size and shape, though usually cylindrical. This is equipped at its center preferably with a tube 2 which extends from a point near the bottom of the tank 1, upon which it is supported, to a point above the high water level of said tank 1. The water to be softened, together with the chemical solution to be admixed therewith, are fed into the top of the tube 2 and in flowing down through the same precipitation of the hard salts of the hard water is effected and the precipitates collect in the bottom of tank 1, from which they are suitably drained in any desirable manner as, for example, by means of the sludge cock or valve 3.

In the instance illustrated, the supply pipe for hard water under pressure is shown at 4, the water flowing in the direction indicated by the arrow. A ball cock 5 interposed in said pipe 4 regulates the flow of water into tank 1, primarily for maintaining a predetermined high level therein. At another point in said pipe 4 beyond the valve 5 is a second ball cock 6 which controls the flow of water from a branch pipe 7 leading into a small tank 8 and serving to maintain a constantly uniform or substantially uniform level of water in the latter. The hard water fed to said tank 8 flows by gravity from the pipe 9, which may be provided with a valve 10 into the top of the tube 2, the constant level of water maintained in the tank 8 obviously rendering the flow from the pipe 9 constantly uniform.

Associated with the tank 1 is a tank 11 adapted to contain the chemical solution to be admixed with the hard water flowing from the pipe 9. The tank 11 is suitably supported at a desired elevation and is equipped in the bottom with suitable stirring and agitating devices 11$^a$ which are power actuated to maintain the solution in continuous agitation in order to prevent settling of undissolved chemicals contained in the water in said tank to the bottom of said tank. The means for effecting rotation of said stirring and agitating devices may be of any suitable type, and I have herein shown the same as comprising a vertical shaft 12 extending through a stuffing box 12$^a$ in the bottom of the tank and which is geared by means of bevel gear 12$^b$ and pinion 12$^c$ with a horizontal shaft 13 which is suitably actuated. The tank 11 is equipped at one side with a funnel 14 communicating at its bottom portion with the bottom portion of the tank 11 for leading chemical solution to said tank directly into the zone of action of the stirring and agitating devices. The tank 11 has a predetermined capacity which, for example, might be normally thirty or thirty-five gallons, depending entirely upon the capacity of the plant and being variable in proportion to the latter. The capacity will be based, generally, upon the number of hours that the plant is intended to be continuously operated during each day and, assuming that period to be ten hours and the quantity of hard water to be softened to be one thousand gallons per hour during this period, then the tank 11 would have a capacity for chemical solution whereby it would be adapted, during the said ten hours, to feed constantly and uniformly from the contained quantity of solution the exact amount per hour or fraction thereof which would be required to be admixed with the said one thousand gallons of hard water to effect softening of the latter.

Adjacent the top of the tank 11 and at one side thereof is an overflow tank or box 15 adjacent the top of which and the top of the tank 11 is an overflow opening 16 (Fig. 5) through which chemical solution flows from tank 11 into tank 15. This solution is drained from the tank 15 through the pipe 17 which connects with the suction end of a suitable pump 18, which may be of any desired type and which is constantly operated as by means of motor 18$^a$ belted to shaft 18$^b$, the latter being similarly associated with shaft 13 and with pump shaft 18$^c$. Extending from the tank 1 into the said tank 15 is a pipe 19 which passes underneath the tank 15 and thence upwardly through the bottom thereof. It terminates just above the bottom of said tank 15, and its discharge end is controlled by means of a ball cock 20 which serves to maintain a constant level of water in said tank 15 derived preferably from the tank 1, with which said pipe 19 communicates at a point above the level of the top of the tank 15, as shown in Fig. 1. The purpose of supplying water from the pipe 19 is primarily to maintain a constant feed of water to the pump 18 in order to prevent the latter from running dry. The level of water maintained in the tank 15 by means of the pipe 19 is below the lowest portion of the overflow opening 16 for obvious reasons.

Mounted in the tank 11 and loosely disposed therein is a second tank or container 21 which is a floating element held in place by means of suitable guide rods 22 which are mounted on tank 11. The said tank 21 has a dished or conical bottom in the center of which there is an opening controlled, for example, by a mushroom valve 23, the stem of which projects upwardly through said tank and is equipped with a manually operable element 24 disposed above the top thereof. The said valve 23 maintains a fluid tight joint to prevent the passage of liquid from tank 21 into the tank 11 or vice versa except when said valve is opened when it is desired to transfer the water from the tank 21 to the tank 11. The tank 21 obviously serves to effect a displacement of a part of the solution contained in the tank 11 and, if caused to sink gradually into said tank 11, the displacement of said solution will cause an overflow thereof into the tank 15. Such solution will then pass to the pump and will be discharged through the pipe 25 into the top of the tube 2 contiguous to the point of discharge of hard water from tank 8 into the same.

A constantly uniform flow of solution from tank 11 into tank 15 through the orifice 16 is obtained in a very simple and efficient but indirect manner by means of the pipe 26 extending from said tank 8 and discharging into the float tank 21. Said pipe 26 may be provided with a manually operable valve 27 and the rate of flow of water therefrom fixed in any suitable way, and preferably a permanent way, by partially choking the delivery end of said pipe in any well known manner. Thus, for example, the flow of water from the pipe 26 into the tank 21 may be limited to ten gallons an hour, if that should be the proper proportion to the flow of a thousand gallons an hour from the pipe 9, the flow from the latter being similarly, definitely and permanently controlled by choking the discharge end of said pipe in any suitable and well known manner. The valves 10 and 27 would be used only to completely shut off the flow from both said pipes and would be either wide open or entirely closed if made use of.

It will be obvious that as water flows into the tank 21 at a uniform rate the latter will be kept constantly sinking into the solution contained in the tank 11 and thus effect a constant and uniform displacement of said solution to effect an overflow into the said tank 15 and thence to the pump and to the tube 2, as previously stated.

The pipe 19 would be discharging water into the tank 15 only in the event that the pump should drain said tank more rapidly than the chemical solution flows into the same, and obviously it is preferable to so arrange the capacity of the pump as to withdraw water from tank 15 with sufficient rapidity to maintain a continuous flow from the pipe 19 and thus effect dilution of the chemical solution and thereby a more thorough distribution thereof in the water flowing through the pump and delivered into the tube 2. Thus the volume of water admixed with the chemical solution by means of the pipe 19 will be a definite proportion of the total volume to be softened and will not affect the relative volumes of hard and soft water fed into the top of the tube 2 to effect the desired result. The volume of water fed to tank 15 by pipe 19 may be, for example, ten per cent of the total discharge from pipes 9 and 19.

After the tank 21, which preferably has a capacity about equal to the total quantity or volume of chemical solution to be fed into the tube 2 during the aforesaid period of ten hours, for example, is filled to the predetermined level, indicating that an equivalent amount of said solution has been thus exhausted from said tank 11, the valve 23 is opened and the said tank 21 raised, thereby effecting a transfer of water from the float tank 21 into tank 11 as said tank 21 is raised above the level of water or solution in said tank 11. Suitable means may be provided for conveniently raising the tank 21, the same being omitted from illustration as superfluous and constituting no part of the invention per se. The valve 23 is then closed and, after adding a sufficient or proper amount of chemical from the tank 11 through the funnel 14, the operation aforesaid may be repeated. Preferably, as soon as the said tank 21 contains the aforesaid amount of water, the valves 10 and 27 are closed and during the short time interval required to replenish the supply of chemical solution in the tank 11 soft water may be conveniently drawn from the tank 1, thereby merely reducing the water level in the latter temporarily until the supply can be replenished. Generally, however, at the time the tank 21 is so filled the operations for the day are over and there is no need to withdraw any water from the tank 1 until the begininng of operations on the following day.

In operation, water from the supply pipe 4, controlled by ball-cock 5, enters the small distributing tank 8, said ball-cock 5 constituting the main control determined by the water level in tank 1. The second ball-cock 6 controls flow into the tank 8 from which the major part of the water flows into the top of the tube 2 in tank 1 while a small portion flows through pipe 26 directly into the float 21 in the tank 11. The tank 11 is filled with the chemical solution which is maintained uniform by the agitating device 11$^a$. The flow of water into float 21 causes the latter to sink gradually and to thus displace the solution in tank 11, causing the same to overflow through the orifice 16 into the box 15 which as above stated also receives water from tank 1, through pipe 19 controlled by ball-cock 20 in said box 15. The latter is connected by means of pipe 17 with the intake end of the pump 18, which delivers all liquid entering said box into the top of the tube 2. The function of pipe 19 is merely to maintain the pump 18 primed at all times and to this end it is preferable that pipe 19 should lead from a point in the tank 1 below the high level of water therein and above the level of box 15 in order that this pump priming may not be subject to interruption except when withdrawal of water from tank 1 exceeds supply capacity of pipe 4 for a sufficient period of time to drop the water level in tank 1 to a point below its connection with the pipe 19.

The rate of flow of solution from tank 11 through orifice 16 is exactly equal to the rate of flow of water from pipe 26 into float 21. An exact proportioning of this flow to that into the tank 1 from tank 8 may be very nicely regulated by means of valves 10 and 27 and the valve in pipe 19. The capacity of tank 11 being sufficient to assure a run of any predetermined number of hours, and flow into float 21 being so proportioned to that capacity as to substantially exhaust the contents of tank 11 within that period, a shut-down follows during which the float 21 is drained by opening valve 24 and then raising said float. In this operation the tank 11 receives exactly the equivalent of the volume of solution exhausted therefrom so that by adding the necessary chemicals, the solution is renewed. Valve 24 being closed, the foregoing operation is repeated.

It will be noted that by means of my said apparatus I provide very simple and efficient means for effecting a constantly uniform supply of both hard water to be softened and chemical solution to be admixed with the hard water in definite proportion to the volume of the latter and to its rate of flow without effecting any waste of water or chemical solution, and I am, therefore, enabled to operate the plant with great accuracy and uniform results.

While I have shown the preferred embodiment of the invention in the accompanying drawings, it will be obvious, of course, that such embodiment may be changed and varied in details of construction and arrangement as may suggest themselves to persons skilled in the art without departing from the invention as defined in the appended claims.

I claim as my invention:

1. In a water-softening apparatus of the kind specified, means for effecting feed of a predetermined quantity of chemical solution to a predetermined volume of water to be softened, including a container for water adapted to be connected with a source of supply of water under pressure, a ball-cock controlling the influx of water to said container for maintaining a substantially constantly uniform level of water in said container, an outlet pipe for water to be softened associated with said container and adapted to maintain a constantly uniform flow therefrom, a source of supply of chemical solution adapted for admixture with said water flowing from said outlet pipe, a second supply-pipe for water operatively associated with said source of supply of chemical and adapted to maintain a constantly uniform flow of water at a predetermined rate and ratio to the flow from said first named supply pipe for effecting a flow of said chemical solution from said source of supply equal to the weight and rate of flow of the water discharged from said second supply pipe.

2. In a water softening apparatus of the kind specified, means for effecting feed of a predetermined quantity of chemical solution to a predetermined volume of water to be softened, including a container for water adapted to be connected with a source of supply of water under pressure, a ball-cock controlling the influx of water to said receptacle for maintaining a substantially constantly uniform level of water in said container, an outlet pipe for water to be softened associated with said container and adapted to maintain a constantly uniform flow therefrom, a source of supply of chemical solution adapted for admixture with said water flowing from said outlet pipe, a second supply pipe for water operatively associated with said source of supply of chemical and adapted to maintain a constantly uniform flow of water at a predetermined rate and ratio to the flow from said first named supply pipe for effecting a flow of said chemical solution from said source of supply equal to the weight and rate of flow of the water discharged from said second supply pipe, without effecting dilution of said chemical solution by the water discharged from said second supply pipe.

3. In a water softening apparatus, the combination with a main and an auxiliary water supply pipe and means for effecting a constantly uniform flow of water from each thereof, of a source of chemical solution adapted to be admixed with water discharged from said main supply pipe, and means operatively associated with said source of supply of chemical solution and said auxiliary supply pipe for effecting flow of said solution for admixture with the water discharged from the main supply pipe at exactly the same rate of flow measured by weight as that of the water discharged from the auxiliary supply pipe.

4. In a water softening apparatus, the combination with a main and an auxiliary water supply pipe and means for effecting a constantly uniform flow of water from each thereof, of a source of chemical solution adapted to be admixed with water discharged from said main supply pipe, and gravity means operatively associated with said source of supply of chemical solution and said auxiliary supply pipe for effecting flow of said solution for admixture with the water discharged from the main supply pipe at exactly the same rate of flow measured by weight as that of the water discharged from the auxiliary supply pipe.

5. In a water softening apparatus, the combination with a main and an auxiliary water supply pipe and means for effecting a constantly uniform flow of water from each thereof, of a source of chemical solution adapted to be admixed with water discharged from said main supply pipe, and means operatively associated with said source of supply of chemical solution and said auxiliary supply pipe for effecting displacement and flow of said solution from said source of supply thereof at the exact rate of flow by weight of water from said auxiliary supply pipe.

6. In a water softening apparatus, the combination with a main and an auxiliary water supply pipe and means for effecting a constantly uniform flow of water from each thereof, of a source of chemical solution adapted to be admixed with water discharged from said main supply pipe, and means operatively associated with said source of supply of chemical solution and said auxiliary supply pipe for collecting the water discharged from said auxiliary supply pipe and thereby effecting displacement and flow of said solution from said source of supply thereof at the exact rate of flow by weight of water from said auxiliary supply pipe.

7. In an apparatus for softening water, a storage tank, means for effecting flow of hard water into the same at a constantly uniform rate of flow, a source of supply of chemical solution, and means for effecting a constantly uniform rate of flow of said solution into said tank in a fixed ratio to the rate of flow of hard water into the same, said means including a supply pipe adapted to deliver water at the constantly uniform rate of flow by weight desired for said solution, and means whereby said water from said supply pipe effects continuous displacement of the same weight of said solution without admixing said displacing water with said solution.

8. In a water softening apparatus of the kind specified, a container for chemical solution and means for effecting withdrawal of predetermined quantities of said solution therefrom including an open container adapted to float in the chemical solution in said container, the latter provided with an overflow opening, said float adapted to be caused to sink to displace and cause the overflow of a given weight of said solution by loading said float with an equal weight.

9. In a water softening apparatus of the kind specified, a container for chemical solution and means for effecting withdrawal of predetermined quantities of said solution therefrom including an open container adapted to float in the chemical solution in said container, the latter provided with an overflow opening, said float adapted to be caused to sink to displace and cause the overflow of a given weight of said solution by feeding to it water in an amount to equalize the weight of the solution to be discharged from the container.

10. In a water softening apparatus of the kind specified, a container for chemical solution and means for effecting withdrawal of predetermined quantities of said solution therefrom including an open container adapted to float in the chemical solution in said container, the latter provided with an overflow opening, said float adapted to be caused to sink to displace and cause the overflow of a given weight of said solution by feeding to it water in an amount to equalize the weight of the solution to be discharged from the container, said water adapted to be introduced into said float more or less gradually at a rate corresponding to the rate of discharge, by weight, of said solution desired during a given period of time.

11. In an apparatus of the kind specified, the combination with a reaction and storage tank for soft water, of means for feeding hard water to be softened and the chemical solution to be admixed therewith to said tank in a constantly uniform and predetermined proportionate flow, including an auxiliary tank disposed above said first-named tank, means for maintaining a substantially constantly uniform water level in said tank, a main supply pipe for hard water leading from said auxiliary to said first named tank, a source of chemical solution, a water supply pipe leading from said auxiliary tank to said source of chemical solution, means associated with said source and said last named water supply pipe for effecting flow of said solution from said source at the rate of flow by weight of water from said last named supply pipe, and means for introducing said solution into the top of the first named tank.

12. In an apparatus of the kind specified, the combination with a reaction and storage tank for soft water, of means for feeding hard water to be softened and the chemical solution to be admixed therewith to said tank in a constantly uniform and predeterminedly proportionate flow, including an auxiliary tank disposed above said first named tank, means for maintaining a substantially constantly uniform water level in said tank, a main supply pipe for hard water leading from said auxiliary to said first named tank, a source of chemical solution, a water supply pipe leading from said auxiliary tank to said source of chemical solution, means associated with said source and said last named water supply pipe for effecting flow of said solution from said source at the rate of flow by weight of water from said last named supply pipe, and means for introducing said solution into the top of the first named tank without effecting contact of said displacing water with the solution.

13. In apparatus of the kind specified, a container for chemical solution open at the top and provided with an overflow opening adjacent the top thereof, an open tank adapted to float in the solution and adapted to receive water to cause it to sink and effect discharge of solution from said overflow opening and a manually operable valve in the bottom of said float tank whereby upon opening said valve and lifting said float tank the water contained therein will flow into said container.

14. In apparatus of the kind specified, a container for chemical solution open at the top and provided with an overflow opening adjacent the top thereof, an open tank adapted to float in the solution and adapted to receive water to cause it to sink and effect discharge of solution from said overflow opening and a manually operable valve in the bottom of said float tank whereby upon opening said valve and lifting said float tank the water contained therein will flow into said container, said float tank having a predetermined capacity for a volume of water adapted when admixed with a predetermined amount of chemicals, to constitute a batch of solution sufficient to maintain the apparatus in operation for a predetermined period of time.

ROBERT O. FRIEND.